May 26, 1964

D. LABINO 3,134,828

METHOD FOR HEATING GLASS MELTING POT

Original Filed Jan. 26, 1956

INVENTOR.
Dominick Labino
BY
Nobbe & Swope
ATTORNEYS

May 26, 1964

D. LABINO 3,134,828

METHOD FOR HEATING GLASS MELTING POT

Original Filed Jan. 26, 1956

INVENTOR.
Dominick Labino
BY
Nobbe & Swope
ATTORNEYS

United States Patent Office 3,134,828
Patented May 26, 1964

3,134,828
METHOD FOR HEATING GLASS MELTING POT
Dominick Labino, Grand Rapids, Ohio, assignor, by mesne assignments, to Johns-Manville Corporation, New York, N.Y., a corporation of New York
Continuation of application Ser. No. 561,430, Jan. 26, 1956. This application Jan. 18, 1960, Ser. No. 3,709
4 Claims. (Cl. 263—52)

The present invention relates broadly to the art of glass melting. More particularly, it is concerned with an improved method of heating a glass melting pot and apparatus for carrying out such a method.

This application is a continuation of my formerly copending application Serial No. 561,430, now abandoned.

In the melting of glass intended for fiber formation, it has been found that better control can be maintained if the melts are carried out in relatively small containers or pots made of refractory clay. By reason of their size and low cost, replacements can be easily and rapidly made without appreciable loss of production time. This replacement, however, requires that a cold pot be placed directly in an area of operation and quickly absorb sufficient heat from a high temperature source to produce molten glass from materials supplied to the pot.

In order to bring about a satisfactory and gradual preheating of a new clay melting pot, it is now proposed to preheat the same through a range of suitably increasing temperatures from a source of radiant heat until the pot can and will sustain its structure under the more direct form of heat employed in a sustained melting operation and thereby prevent initial subjection of the pot to overheating in localized areas with resultant fracture.

It is therefore the principal object of this invention to provide an improved method for rapidly preheating a glass melting pot to a temperature at which it can withstand the high temperatures necessary for glass melting, and apparatus for producing a zone of radiant heat by which the pot can be quickly and evenly brought up to working temperature.

Another object of the invention is to provide an improved method and apparatus for preheating a cold refractory glass melting pot from a source of radiant heat and then continuing heating from a direct heat source adapted to maintain the pot at sustained glass melting temperatures.

Another object of the invention is to provide an improved method and apparatus for preheating a cold refractory glass melting pot from a radiant heat source while the pot is positioned in an operating zone and switching to glass melting temperature conditions in situation without change of physical arrangement.

Other objects and advantages of the invention will become more apparent during the course of the following description when taken in connection with the accompanying drawings.

In the drawings wherein like numerals are employed to designate like parts throughout the same:

Figure 1:
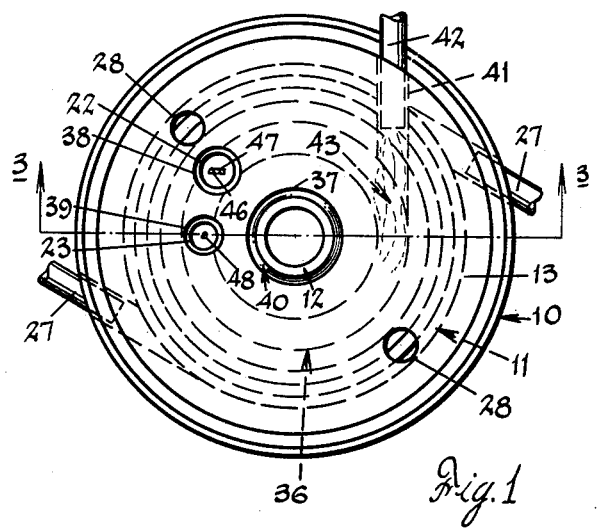
FIG. 1 is a plan view of a glass melting apparatus as constructed in accordance with this invention.
Figure 2:
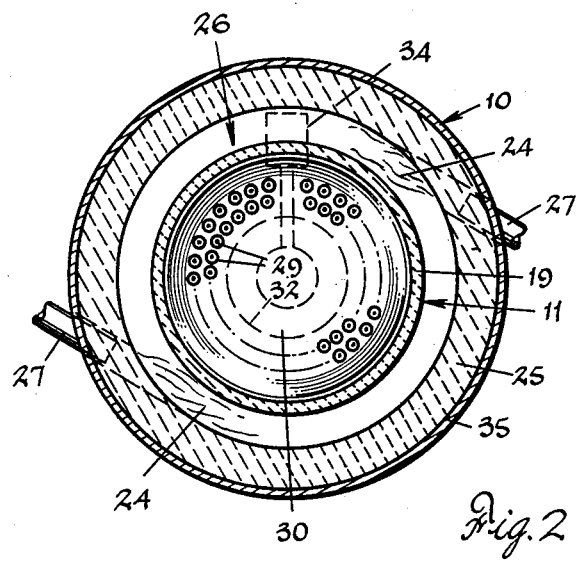
FIG. 2 is a horizontal cross-sectional view of the glass melting apparatus.
Figure 3:
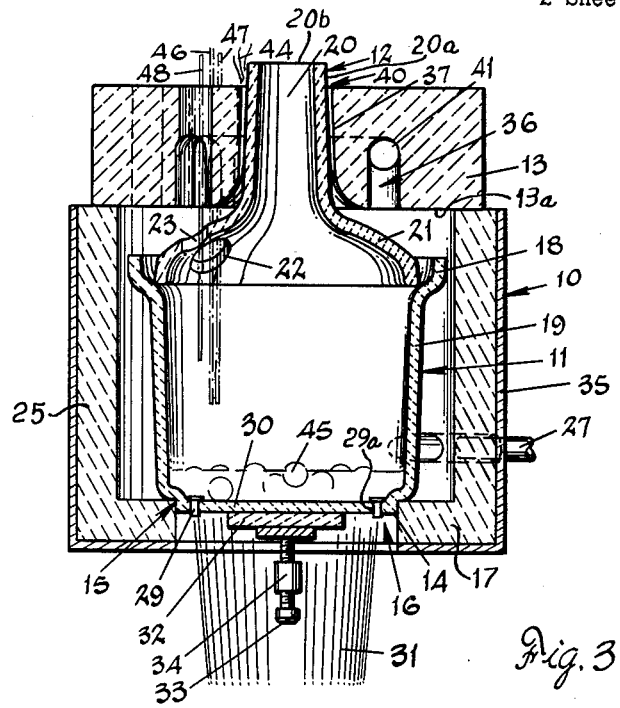
FIG. 3 is a vertical cross-sectional view of the glass melting apparatus as taken on line 3—3 of FIG. 1.

With more particular reference to the drawings, there is shown in FIGS. 1–3 a metal-jacketed container or casing 10 of refractory material within which is located a clay pot 11 in which glass batch material is melted to produce glass filaments or fibers. As herein provided, the pot 11 is closed at its upper end by a top or cover 12. A firing chamber is formed within the container 10 by a block or like 13 which covers the upper end thereof. As best seen in FIG. 3, the bottom of the pot 11 has a downwardly directed rim of reduced diameter 14 whereby a shoulder 15 is formed to support said pot on the upper edges of a centrally disposed opening 16 in the floor or bottom 17 of the container 10.

The upper end of the pot 11 is outwardly flanged as at 18 from the nominal diameter of the pot wall 19; the inner surface of flange 18 serving as a support platform for the lid or cover 12. This cover has a vertically disposed stack or chimney 20 of substantially conical cross-section which is flared into an outwardly and downwardly extending skirt or lower portion 21. The stack 20 provides an inlet throat portion 20a having an exposed port 20b for the periodic supplying of the pot with batch material in the form of glass marbles while the lower skirt 21 has openings formed therein as at 22 and 23 through which probes may be inserted for a purpose to be later disclosed.

In order to substantially surround the circular wall 19 of the pot 11 with an evenly directed flame, as indicated at 24, FIG. 2, the container side wall 25 is concentrically spaced from wall 19 and is similarly circular in cross-section to define a heating chamber or space 26. The space 26 therebetween provides a passageway in which the flames are caused, from tangentially arranged burner 27, to follow a circular path and rise toward the lid or block 13 which is provided with exhaust ports 28. The position of the burners 27 is such that a uniform flame envelope surrounds the pot 11 to heat the walls of the pot whereby glass materials will be subjected to an even and uniform heat. By providing a container 10 for the melting pot 11 having a similarity of cross-section, there will be no areas in which the flame can produce turbulence or hot spots with resultant uneven heating of the pot or its contents.

During normal firing and melting operations, there is a substantially continuous discharge of the molten glass through a plurality of small orifices 29a provided in the bottom base 11a of the pot 11, said orifices being preferably lined with metal tips 29. These tips 29 may be of platinum or other suitable metal or metal alloy and are arranged in circular array in the floor or base 30 of the pot 11. For example, the tips can be arranged in a plurality of substantially concentrically circularly arranged rows as shown in FIG. 2. The tips depend from the pot bottom and their lower ends generally are located in the open area 16 of the bottom wall 17 of the container 10. The glass discharging from the tip 29 produces continuous filaments 31 which are attenuated by conventional drawing rolls and then gathered to form a continuous strand or otherwise worked according to any desired procedure.

In order that the central area of the pot base 30 may be adequately supported, provision is made to locate a suitable refractory disk 32 firmly against the under surface by means of an adjusting screw member 33. The member 33 is threadably mounted in a bracket 34 which is carried in any suitable manner by the metallic jacket 35 for the container 10.

When beginning a new melting operation as by replacing a pot, the present invention provides for applying an even and gradually increasing heat to the pot to bring it quickly up to melting temperature without danger of fracture. Where a cold pot is placed directly in a zone of sufficiently high temperature to melt glass, it will be obvious that the thermal shock may probably result in fracture of the pot. To avoid lost down time and inconvenience resulting from such thermal shock, the present invention provides for application of uniform and steadily increasing heat to bring a cold pot to operating temperature in a minimum amount of time without danger of breakage from thermal shock.

Accordingly, the present invention provides a source of infrared or radiant heat to bring a cold pot rapidly and uniformly up to glass melting temperature. Also during the pre-heating process, a small quantity of glass material is rendered molten in the pot to provide a cushion upon which further glass materials, such as glass marbles, can be dropped through the stack 20 without cracking the bottom 30 of the pot as a result of physical impact.

For this purpose, the block 13 is provided in its bottom surface with an annular groove 36 of suitable depth which is substantially concentric with the centrally disposed, circular and tapered opening 37 through which stack 20 projects. The block 13 is also provided with openings or ports 38 and 39 in vertical alignment with the openings 22 and 23 in the cover 12 for the insertion of control probes and a thermocouple. Preferably the opening 37 is sufficiently larger than the stack 20 to afford an upwardly open area 40 to permit the escape of exhaust gases. The annular groove 36 in block 13 is equipped with a tangentially located, outwardly directed passageway 41 formed in the block 13 and into which a burner 42 is inserted. When in operation, the burner 42 produces a flame 43 which follows groove 36, FIG. 1, and the exhaust gases 44 escape from the groove by way of the open area 40 around the stack 20. The heat of flame 43 creates a hot, radiant atmosphere which is directed downwardly onto the cover 12 and gradually throughout the pot 11 without directly impinging thereupon. As the temperature of the pot increases, the marbles, indicated in one way or another at 45, become molten and the pot is then conditioned for production.

When glass melting temperature has been reached, the burner 42 is turned off and the direct firing burners 27, are started. These burners, as previously disclosed, are arranged in the vicinity of the lower area of the container 10 to direct their flame in a circle around the wall 19 of the pot, particularly in the vicinity of its lower portion where the glass batch is to be maintained at flowing or working temperature. By means of a thermocouple 46 inserted through openings 22 and 38, the temperature within container 10 can be readily determined for the purpose of switching over from burner 42 to the burner 27.

In order to automatically maintain a desired molten glass level a probe 47 may be inserted through apertures 22 and 38. The probe 47 serves to complete an electric circuit supplied to the molten glass by a similar probe 48 passed through and located in the openings or ports 23 and 39. Since glass at melting temperatures is electrically conducting, a flow of current will be maintained between the probes as long as the glass level is located above their ends. When one of the probes, such as the probe 48, is exposed above the glass level, the flow of electric current is broken. This serves to activate the marble feeder for purpose of replenishing the glass level. At this time, the current flow between the probes will be reestablished, and the marble feed is stopped.

Figure 4:
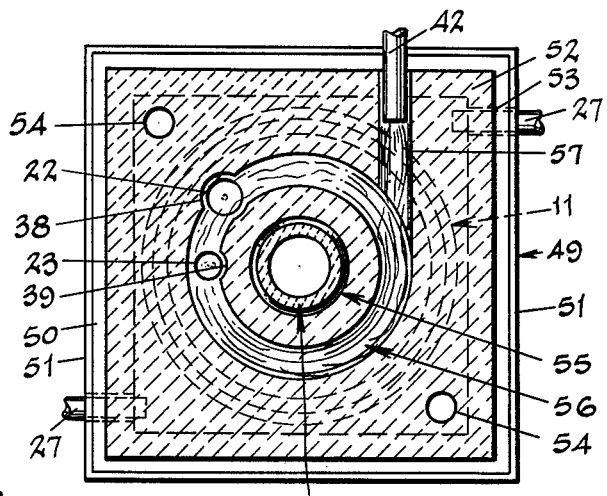
FIG. 4 is a horizontal cross-sectional view of a modified form of melting apparatus.
Figure 5:
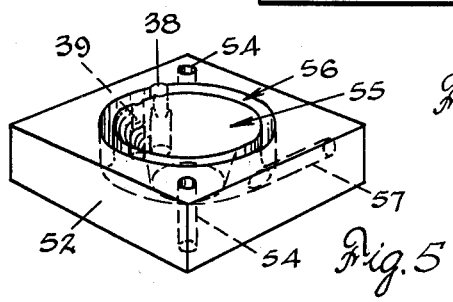
FIG. 5 is a perspective view of a cover block for the apparatus of FIG. 4 in an inverted position.

As illustrated in FIGS. 4 and 5, the spirit of this invention is as well adapted for use in connection with the prefiring of a glass-melting pot that is supported within a container which, for example, is square, or other than circular in cross-section as illustrated in FIGS. 1-3. The pot 10 may thus be disposed within a container 49 having side walls 50 confined within a metal sheath or jacket 51. This container is closed at its upper end by a block 52. The firing chamber within the container may be heated by burners 27 inserted through openings 53 in side walls 50 and the exhaust gases discharged through ports 54 provided in the block 52, or the centrally disposed opening 55 in which the stack 20 of cover 12 is situated.

The block 53 is equipped with a groove 56 concentrically arranged around the opening 55, which groove is substantially the same in size and area as the groove 36 of block 13. And by tangentially disposed port 57, the burner 42 can be located to direct a flame into the groove 56 to provide a radiant source of heat.

It will accordingly be seen that a prefiring period may be provided in advance of a continuous glass-melting operation without the replacement or substitution of parts other than the pot. That is, a cold pot can be placed in an operating area and by a continuous operation be brought up to glass melting temperature and switched over to direct firing without breakage. The pot, while initially cool and holding a small supply of glass marbles, is gradually warmed, and progressively heated by radiation from the circular flame 43 contained within the groove 36.

Additionally, by the provision of a circular area or chamber about the pot 11, as shown in the preferred embodiment of this invention in FIGS. 1-3 the firing of such a pot can be carried out for longer periods of time without replacement or danger of exposure to overheating in localized areas. And, by the provision of a radiant heat source and a direct heat source of controlled patterns, it is believed that there has been developed a glass-melting apparatus which reduces the tendency of clay pots to fail under initial firing and assures a prolongation of their useful life under normal melting operations. In fact, actual tests have indicated that a clay pot at room temperature, can be heated to a working temperature of 2000° F. in as little as two hours without damage by means of the present invention.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In the method of melting glass in a refractory clay receptacle the steps comprising, providing a cold clay glass melting receptacle in a cold glass melting situs, subjecting said receptacle to a source of radiant heat directed downwardly upon said receptacle, retaining said receptacle in heat-absorbing relation to said radiant heat source until the receptacle has attained glass melting temperature, and concomitantly discontinuing said source of radiant heat and switching to a source of heat applied directly to said receptacle.

2. A method for preheating a refractory clay glass melting pot comprising the steps of providing a cold clay glass melting pot in a cold glass melting situs, applying radiant heat to said pot by directing the heat downwardly upon the top of the pot to gradually and uniformly raise the temperature of the pot, from the top proceeding downwardly, retaining the pot in heat-absorbing relation to said radiant heat source until the body of the pot has attained glass melting temperature, and concomitantly discontinuing said source of radiant heat and switching to a source of heat applied directly to the pot.

3. In the method of melting glass in a refractory receptacle the steps comprising, placing a cold glass melting receptacle into an inactive heating zone adapted to directly heat the walls of the receptacle, applying radiant heat to the receptacle by directing the heat downwardly upon the top of the receptacle to gradually and uniformly raise the temperature of the receptacle, from the top proceeding downwardly throughout the body of the receptacle, retaining the receptacle in heat-absorbing relation to said radiant heat source until the receptacle has attained glass melting temperature, and concomitantly shutting down said radiant heat source and activating said inactive heating zone.

4. In the method of melting glass in a refractory receptacle the steps comprising, placing a cold glass melting receptacle into an inactive heating zone adapted to directly heat the walls of the receptacle, applying radiant heat to the receptacle by directing the heat downwardly upon the top of the receptacle to gradually and uniformly raise the temperature of the receptacle from the top proceeding downwardly throughout the body of the receptacle, retaining the receptacle in heat-absorbing relation to said radiant heat source until the body of the receptacle has attained glass melting temperature, and then activating said inactive heating zone and continuing application of heat from said radiant heat source.

References Cited in the file of this patent

UNITED STATES PATENTS

| | | |
|---|---|---|
| 428,441 | Alzugaray | May 20, 1890 |
| 104,219 | Smith | June 14, 1890 |
| 771,675 | Smith | Oct. 4, 1904 |
| 894,393 | Rankin | July 28, 1908 |
| 2,286,903 | Dockerty | June 16, 1942 |
| 2,360,373 | Tiede | Oct. 17, 1944 |
| 2,517,869 | Grapp | Aug. 8, 1950 |
| 2,618,906 | Hess | Nov. 25, 1952 |
| 2,656,171 | Markley | Oct. 20, 1953 |
| 2,814,657 | Labino | Nov. 26, 1957 |
| 2,974,359 | Van Der Hoven | Mar. 14, 1961 |